Feb. 1, 1938.    M. BOSCH    2,106,826
ELECTRIC CURRENT CONVERSION SYSTEM
Filed April 14, 1937
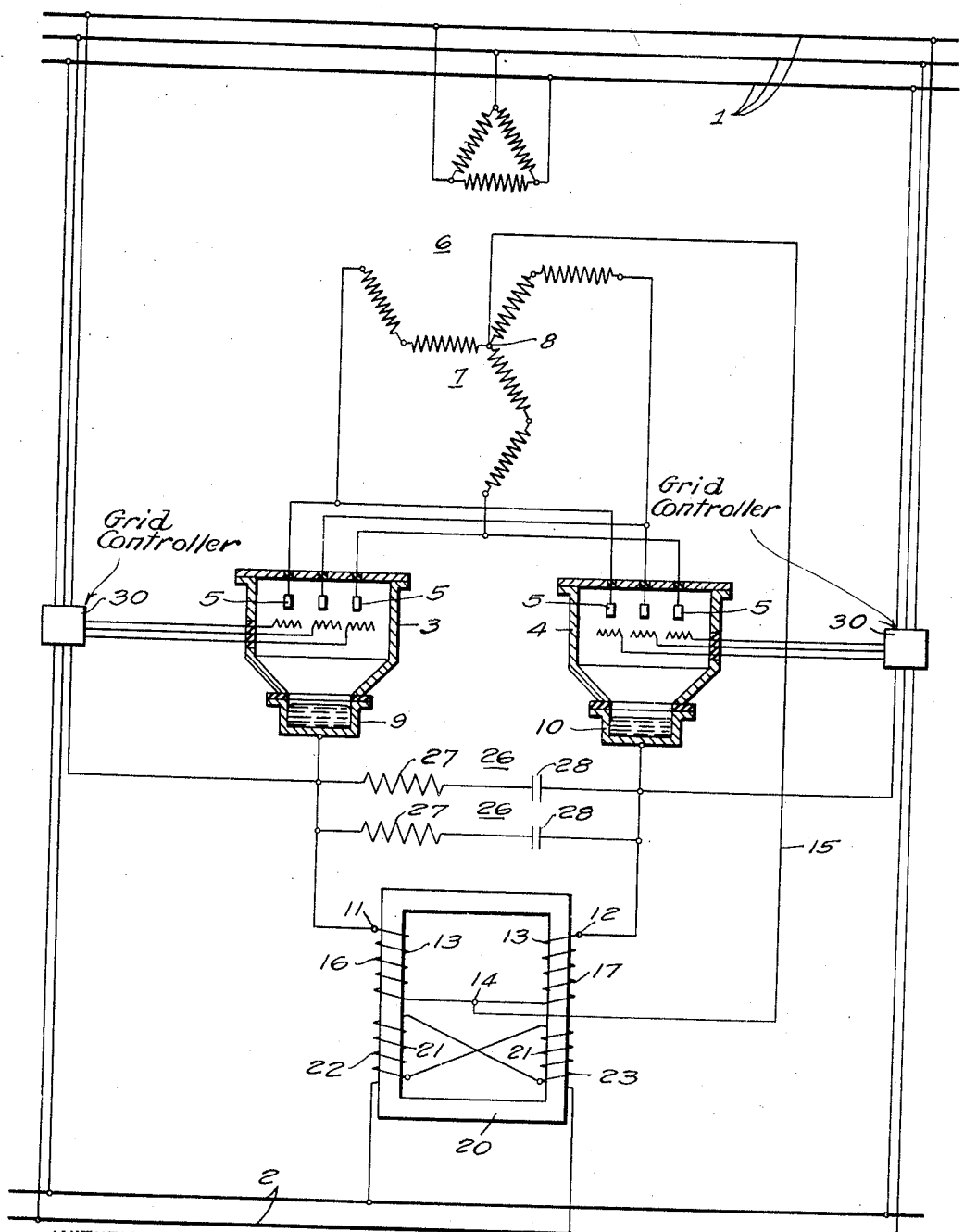
WITNESSES:
INVENTOR
Max Bosch.
BY
ATTORNEY Patented Feb. 1, 1938

2,106,826

UNITED STATES PATENT OFFICE 2,106,826

ELECTRIC CURRENT CONVERSION SYSTEM

Max Bosch, Berlin-Reinickendorf, Germany, assignor to Westinghouse Electric & Manufacturing Company, East Pittsburgh, Pa., a corporation of Pennsylvania Application April 14, 1937, Serial No. 136,398
In Germany April 15, 1936

5 Claims. (Cl. 172—281)

My invention relates to an electric current conversion system and particularly to means for eliminating the harmonics from the output circuit of a vapor-electric frequency changer.

In the operation of vapor electric converters, such as mercury arc rectifiers, it has been found necessary to provide means for eliminating the harmonic currents from the output circuits of the converter. In mercury arc rectifiers, this is usually accomplished by providing shunt filters on the direct current circuit tuned to the various harmonics to be eliminated. In order to support the operation of these tuned circuits as well as to limit the harmonic current, it has been customary to provide suitable series reactors or smoothing choke coils.

When vapor electric converters are utilized as frequency changers, the harmonics generated in the converters are likewise transmitted to the output circuit and heretofore it has been found exceedingly difficult to filter these undesirable frequencies from the output circuit.

It is an object of my invention to provide a simple and reliable filter circuit for minimizing or eliminating the harmonic frequencies before they are introduced into the output circuit.

According to my invention, the necessary shunt filters are connected across the primary of the usual split winding transformer in order to simultaneously apply the harmonic voltages to both ends of the transformer so that their magnetic effects are substantially cancelled or minimized in such manner that little, if any, is transmitted to the secondary or output circuit. To further neutralize any harmonics which might be present, the secondary winding is composed of two winding sections on opposite legs of the transformer core, which are then connected in parallel so as to provide a short circuit path for the harmonic frequencies.

By connecting shunt filters according to my invention, the series reactors heretofore necessary are eliminated, the necessary current limiting reactance being provided by the leakage reactance of the output transformer.

Other objects and advantages of my invention will be apparent from the following detailed description taken in conjunction with the accompanying drawing, in which the figure is a schematic illustration of a converting system according to my invention.

The illustrative embodiment of my invention comprises a polyphase supply network 1 supplying current to a single phase network 2 of suitable frequency by means of two parallel connected vapor arc devices 3—4 having a plurality of grid controlled arc paths 5. These parallel vapor electric devices or rather the individual valves 5 thereof, are connected to the supply circuit 1 by means of a suitable transformer 6, the secondary 7 of which is provided with a mid-tap or neutral point 8. The common cathodes 9—10 of each of the converters 3—4 is connected to the opposite terminals 11—12 of a split primary transformer winding 13 having a neutral point or mid-tap 14 connected by a suitable connection 15 to the mid-tap 8 of the supply transformer 6.

The two winding sections 16—17 of the single phase transformer primary 13 are preferably placed on opposite legs of a suitable transformer core structure 20 and each winding section is alternately energized from one or the other of the vapor electric devices 3—4, as is well known in the art. The secondary or output winding 21 of this single phase transformer is likewise constructed in two sections 22—23 placed on opposite legs of the transformer core 20 and connected in parallel to the single phase output circuit 2. Connected to the outside terminals 11—12 of the primary winding 13 of the single phase transformer are one or more harmonic shunt circuits 26 comprising series connected impedances 27—28 of suitable capacities tuned to by-pass any desired harmonic frequency so that when this harmonic frequency is generated in either of the vapor electric devices 3—4, it is simultaneously applied to both ends 11—12 of both winding sections 16—17 of the transformer primary 13 being returned through the common neutral connection 15 to the supply transformer 6. Because of the opposite direction of current flow in the two winding sections 16—17, the magnetic effect of these harmonic currents is substantially eliminated. Also, because of the parallel connected secondary winding sections 22—23 which provide a short circuit path for the harmonic frequencies, the magnitude of the harmonic frequencies in the primary winding 13 is substantially diminished so that it is unnecessary to provide the heretofore used series reactance in series with each of the vapor electric converters.

In the operation of the frequency changer according to my invention, a suitable polyphase potential at any given frequency such as 60 cycles is applied to the supply transformer 6, the output terminals of which are connected in parallel to the grid controlled valves 5 of the vapor electric devices 3—4. The grid control 30, as is common, alternately blocks the valves on one and then the other of the converters 3—4 so that they alternately supply current to the primary winding 13 of the single phase output transformer, at a suitable reduced frequency such as 20 cycles. The harmonics generated by the operation of the grid controlled converters are by-passed to the opposite terminals 11—12 of the transformer winding 13 by means of the tuned filter circuits 26 in such manner as to be substantially simultaneously impressed on both winding sections 16—17 of the transformer primary 13.

While a large number of tuned circuits 26 would be necessary to completely eliminate all harmonics from the secondary or single phase circuit 2, the use of a relatively few of such circuits 26 will effectively minimize the harmonic disturbances transmitted to the secondary circuit 2.

While for purposes of illustration, a specific embodiment of my invention has been shown and described it will be apparent to those skilled in the art that many modifications and changes can be made therein without departing from the true spirit of my invention and the scope of the appended claims.

I claim as my invention:

1. A frequency converter system for transferring electrical energy between a polyphase network and a single phase network comprising two groups of controlled valves, polyphase transformer means for supplying energy from said polyphase network to said valves, a single phase transformer primary winding having two winding sections, a core structure for said transformer, said winding sections being on opposite legs of said core structure, said primary winding sections being alternately energized at fundamental by said valves and means for simultaneously applying the harmonic voltages generated by said valves to both said winding sections.

2. A frequency converter system for transferring electrical energy between a polyphase network and a single phase network comprising two groups of controlled valves, polyphase transformer means for supplying energy from said polyphase network to said valves, a single phase transformer primary winding having two winding sections, a core structure for said transformer, said winding sections being on opposite legs of said core structure, said primary winding sections being alternately energized at fundamental by said valves and means for simultaneously applying the harmonic voltages generated by said valves to both said winding sections, two secondary winding sections associated with said core, said secondary winding sections being connected in parallel to the single phase network.

3. An electric current conversion system comprising a polyphase alternating current circuit, a single phase alternating current circuit, two parallel connected, grid controlled multi-valve converters for controlling the flow of current between said circuits, transformer means having a neutral connection for supplying current to the valve of said converters, a single phase transformer means having a neutral connection for connecting said converters to said single phase circuit, the neutral points of said transformer means being connected together, and means for neutralizing the effects of harmonics in said single phase transformer means.

4. An electric current conversion system comprising a polyphase alternating current circuit, a single phase alternating current circuit, two parallel connected, grid controlled multi-valve converters for controlling the flow of current between said circuits, transformer means having a neutral connection for supplying current to the valve of said converters, a single phase transformer means having a neutral connection for connecting said converters to said single phase circuit, the neutral points of said transformer means being connected together, and tuned impedances connected across said single phase transformer means for minimizing the transfer of harmonics to said single phase circuit.

5. A frequency converter system for transferring energy between a polyphase circuit and a single phase circuit comprising two groups of controlled arc paths for alternately carrying current between said circuit, polyphase transformer means for connecting said core paths to the polyphase circuit, single phase transformer means for connecting said arc paths to the single phase circuit, a neutral point in each of said transformer means, a common connection to said neutral points and a harmonic by-pass across said single base transformer means whereby harmonics generated in either of said groups of arc paths are applied to both ends of said single phase transformer means.

MAX BOSCH.